J. V. ADAMS.
CUTTER AND ROLLER.
APPLICATION FILED FEB. 27, 1920.
1,397,391.
Patented Nov. 15, 1921.
2 SHEETS—SHEET 1.
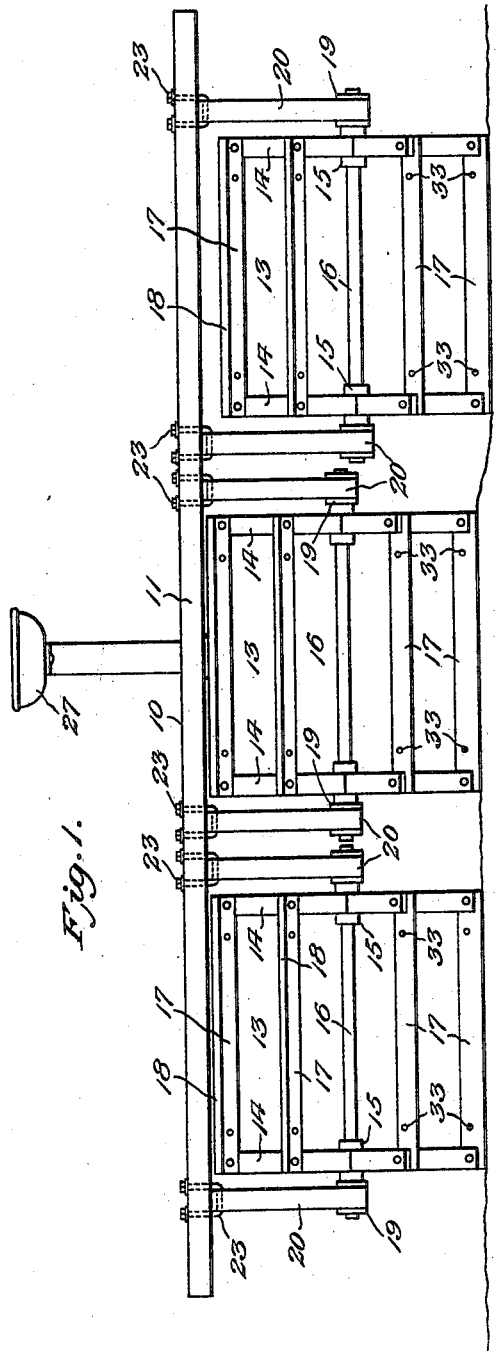
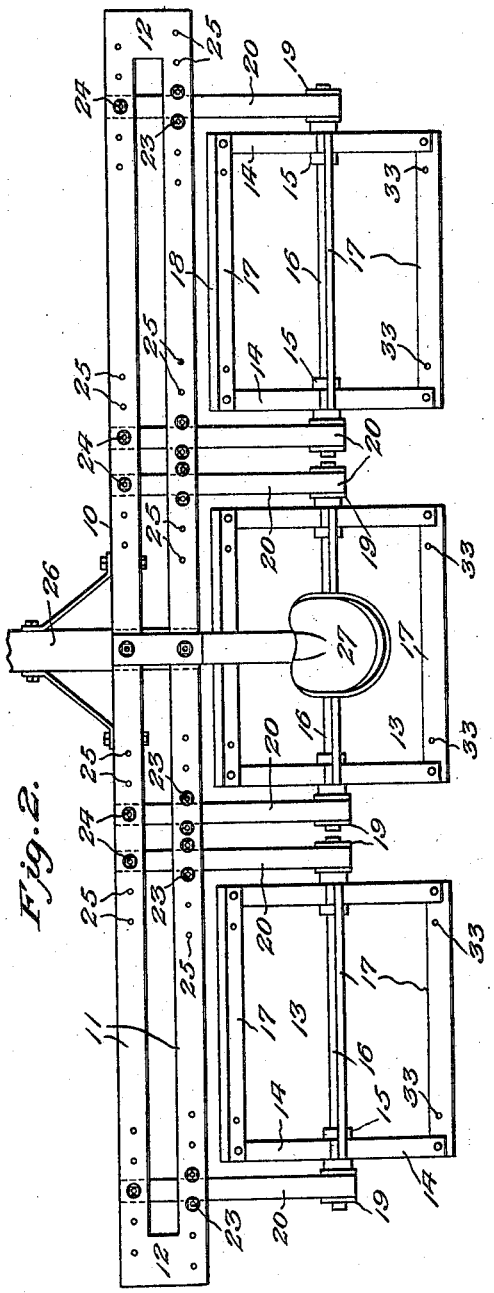
James V. Adams INVENTOR J. V. ADAMS.
CUTTER AND ROLLER.
APPLICATION FILED FEB. 27, 1920.
1,397,391.
Patented Nov. 15, 1921.
2 SHEETS—SHEET 2.
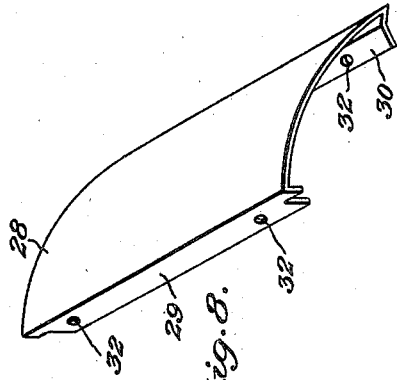
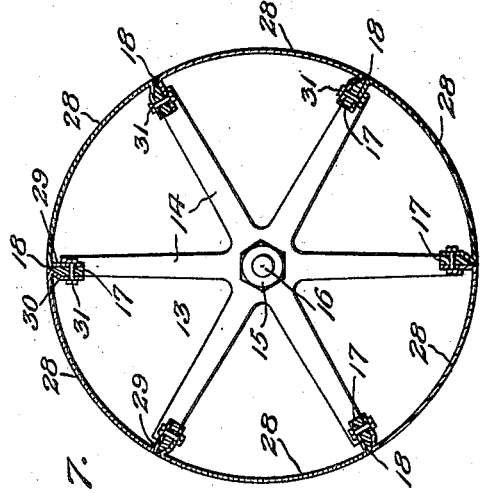
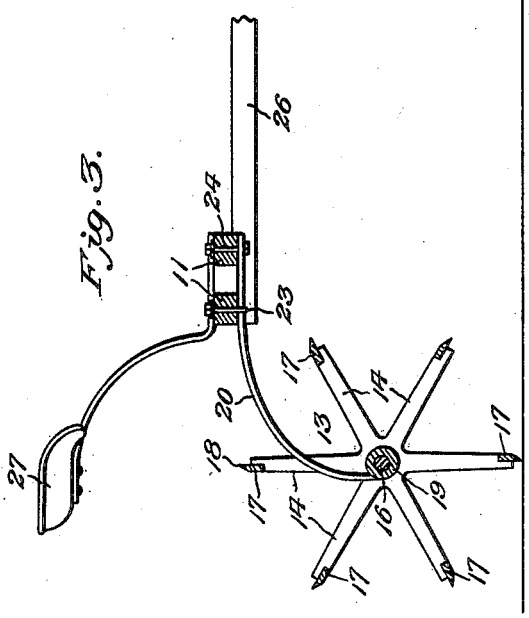
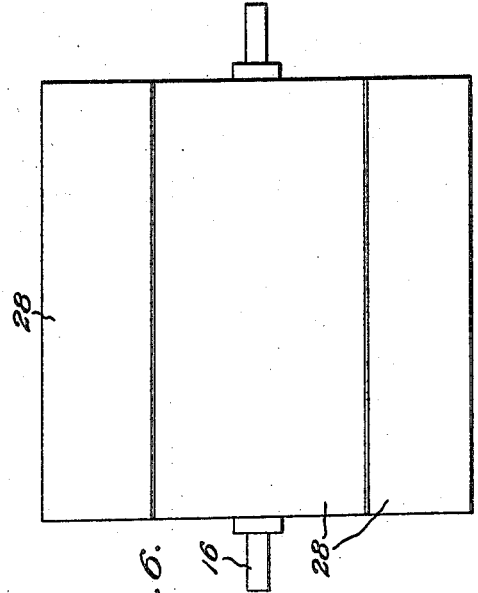
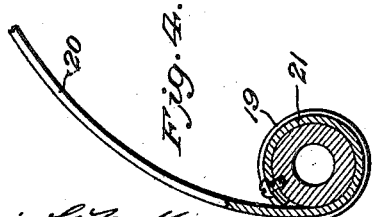
James V. Adams INVENTOR
BY Victor J. Evans
ATTORNEY
WITNESS:

UNITED STATES PATENT OFFICE.

JAMES V. ADAMS, OF YOWELL, TEXAS.

CUTTER AND ROLLER.

1,397,391.   Specification of Letters Patent.   Patented Nov. 15, 1921.

Application filed February 27, 1920. Serial No. 361,664.

*To all whom it may concern:*

Be it known that I, JAMES V. ADAMS, a citizen of the United States, residing at Yowell, in the county of Delta and State of Texas, have invented new and useful Improvements in Cutters and Rollers, of which the following is a specification.

This invention relates to improvements in agricultural machines, the object being to provide a machine especially designed for cutting rows of corn stalks close to or slightly beneath the surface of the ground, so that they may be plowed under. While the machine has been designed for the above purpose, it is equally adapted for cutting vegetation of various kinds.

Another object of the invention is the provision of a machine of this character, in which the cutting elements are mounted upon and form a part of the traction members for supporting the frame of the machine, thus reducing the amount of material necessary in its construction and arranging the cutting elements so that they will dig into and cut beneath the surface of the ground.

Another object is the provision of a machine employing a plurality of cutting elements arranged to cut in rows, so that more than one row of stalks may be cut at a time, novel means being provided for connecting the cutting elements to the machine frame, to allow for unevenness of the ground.

A further object is the provision of means for converting the traction members into land rollers, so that the machine may serve a double purpose.

A still further object is the provision of a machine embodying all of the above characteristics, which is of simple and durable construction and which will adapt itself to various uses.

With the above and other objects in view, the invention also includes the following novel features and details of construction, to be hereinafter more fully described, illustrated in the accompanying drawings and pointed out in the appended claims.

In the drawings:—

Figure 1 is an elevation of a machine embodying the present invention.

Fig. 2 is a plan view of the same.

Fig. 3 is a side view.

Fig. 4 is an enlarged fragmentary sectional view of the bearing for mounting the traction member.

Fig. 5 is a longitudinal sectional view of this bearing.

Fig. 6 is an elevation showing the traction member converted into a land roller.

Fig. 7 is an end view of the same partly in section.

Fig. 8 is a detailed perspective view of one of the arcuate plates for the land roller.

Referring to the drawings in detail, wherein like characters of reference denote corresponding parts, the invention comprises a frame 10 which includes spaced parallel bars 11, connected at their ends by bars 12.

Mounted beneath the frame 10 is a plurality of traction members 13. Three of these members are shown in the drawings and it is of course obvious that this number may be varied as desired. The traction member 13 includes arms 14, which are connected together at their inner ends and provide a hub 15 for the passage of an axle 16. Two sets of arms are connected at their outer ends by blades 17, the cutting edge 18 of which extend outwardly for contact with the surface of the ground.

Each of the traction members 13 is independently secured to the frame 10 and for this purpose the axles 16 extend beyond the ends of the traction members and are received within bearings 19. These bearings are mounted at the ends of spring arms 20, one end of these arms being formed into a loop 21 which lies within an annular seat 22 formed in the periphery of the bearings 19. The opposite ends of the spring arms 20 are engaged by U bolts 23 which pass around the said arms and through openings in one of the bars 11 of the frame, additional plates 24 also passing through openings in the extremities of the arms 20 and the other bars 11 of the frame. As shown in Fig. 2 of the drawings these openings which are indicated at 25 are arranged so as to permit of adjustment of the arms 20 to provide for traction bars of different lengths. By providing a yielding connection between the traction members and the frame, the former may adapt themselves to the uneven surfaces of the ground as shown in Fig. 1.

The machine is provided with a draft tongue 26 and a seat 27 for the accommodation of the driver.

One of the novel features of the invention resides in the provision of means for converting the traction members into land rollers and for this purpose there is provided arcuate shaped plates 28, which are designed to extend between and are connected to the arms 14 and are provided with flanges 29 and 30. The flange 29 abuts one face of one cutting blade 17, while the other flange 30 is so shaped as to engage the opposite face of another cutting blade and to fit over the beveled edge thereof. These plates 28 are secured in position by means of bolts 31, which pass through openings 32 in the flanges 29 and 30 and other openings 33 formed in the cutting plates.

The invention is susceptible of various changes in its form, proportions and minor details of construction and the right is herein reserved to make such changes as fall within the scope of the appended claims.

Having described the invention what is claimed is:—

1. A machine comprising a frame, a traction member mounted for rotation beneath the frame and supporting the latter, cutting blades carried by the traction member and resilient outwardly and downwardly curved bearing means for yieldingly connecting the traction members and frame.

2. A machine comprising a frame, a traction member mounted for rotation beneath the frame and supporting the latter, cutting plates carried by the traction member, springs having one end secured to the frame and bearings carried by the opposite ends of said springs to provide a yielding connection between the frame and traction member.

3. A machine comprising a frame, a traction member mounted for rotation beneath the frame, said member including spaced radially disposed sets of arms and cutting blades connecting the arms, means for operatively securing the traction member to the frame and arcuate shaped plates adapted to be removably secured between the arms and blades to convert the traction member into a land roller and flanges carried by said plates for connection with opposite sides of the cutting blades, one of said flanges being of angular cross sectional formation to receive the cutting edge of the blade.

JAMES V. ADAMS.